(12) United States Patent
Bekaert et al.

(10) Patent No.: US 11,066,514 B2
(45) Date of Patent: Jul. 20, 2021

(54) SOIL RELEASE POLYMER COMPOSITION COMPRISING AN ANIONIC MODIFIED POLYESTER

(71) Applicant: The Procter & Gamble Company, Cincinnati, OH (US)

(72) Inventors: Kevin Bekaert, Wemmel (BE); Andrea Sciacca, Etterbeek (BE); Karel Jozef Maria Depoot, Anzegem-Vichte (BE); Alice Michele Boutoille, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 8 days.

(21) Appl. No.: 16/257,093

(22) Filed: Jan. 25, 2019

(65) Prior Publication Data

US 2019/0225743 A1 Jul. 25, 2019

(30) Foreign Application Priority Data

Jan. 25, 2018 (EP) ..................................... 18153445
Dec. 19, 2018 (EP) ..................................... 18214175

(51) Int. Cl.
| | | |
|---|---|---|
| C11D 1/02 | (2006.01) | |
| C08G 63/183 | (2006.01) | |
| C08G 63/688 | (2006.01) | |
| C11D 17/04 | (2006.01) | |
| C11D 3/43 | (2006.01) | |
| C11D 3/37 | (2006.01) | |

(52) U.S. Cl.
CPC ....... *C08G 63/183* (2013.01); *C08G 63/6886* (2013.01); *C11D 1/02* (2013.01); *C11D 3/3715* (2013.01); *C11D 3/3788* (2013.01); *C11D 3/43* (2013.01); *C11D 17/043* (2013.01)

(58) Field of Classification Search
CPC ........... C11D 1/02; C11D 3/001; C11D 3/201; C11D 3/2041; C11D 3/3715; C11D 11/0017; C11D 17/042
See application file for complete search history.

(56) References Cited

U.S. PATENT DOCUMENTS

| | | |
|---|---|---|
| 2015/0005220 A1 | 1/2015 | Meier et al. |
| 2016/0122692 A1* | 5/2016 | Lant .................... C11D 3/38627 435/263 |
| 2017/0009191 A1* | 1/2017 | Maes .................... C11D 17/042 |
| 2017/0037387 A1* | 2/2017 | Cascao-Pereira ...... C11D 3/386 |
| 2017/0166841 A1* | 6/2017 | Fernandez Martinez ..................... C11D 1/22 |
| 2017/0191003 A1* | 7/2017 | Fernandez-Prieto ........................ C12N 9/2437 |
| 2017/0253839 A1* | 9/2017 | Scheibel ................. C07C 43/11 |
| 2017/0292089 A1* | 10/2017 | Meier .................. C11D 3/0036 |
| 2019/0136218 A1* | 5/2019 | Amin ................. C11D 3/38681 |
| 2019/0144795 A1* | 5/2019 | Nagy ....................... A61K 8/66 435/263 |
| 2019/0194631 A1* | 6/2019 | Olinski ..................... C12N 9/20 |

FOREIGN PATENT DOCUMENTS

| | | |
|---|---|---|
| WO | WO2016/015841 A1 | 2/2016 |
| WO | WO2017/133879 A1 | 8/2017 |

OTHER PUBLICATIONS

EP_search_report for appl. No. 18153445.4-1105, dated Jul. 3, 2018, 8 pages.

* cited by examiner

*Primary Examiner* — Charles I Boyer
(74) *Attorney, Agent, or Firm* — Gregory S. Darley-Emerson

(57) ABSTRACT

A polymer composition that includes a polyester terephthalate. A method of making a liquid laundry detergent composition using the polymer composition.

15 Claims, 1 Drawing Sheet

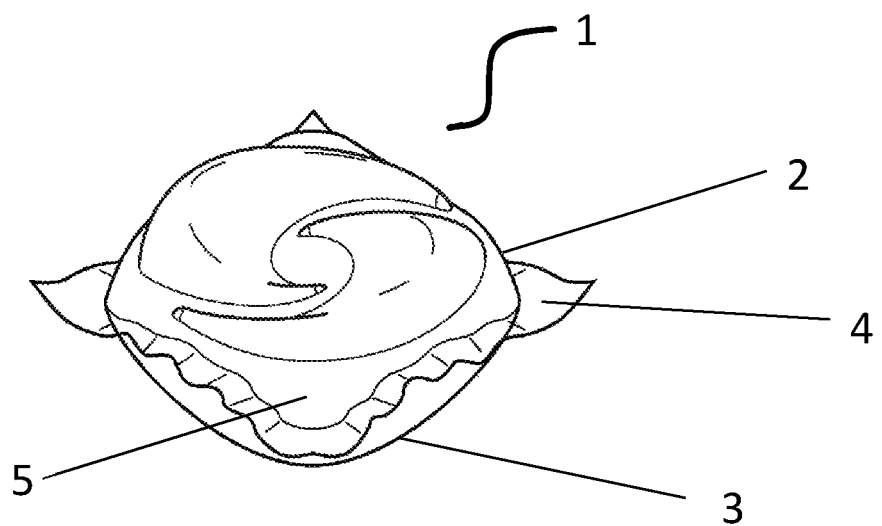

SOIL RELEASE POLYMER COMPOSITION COMPRISING AN ANIONIC MODIFIED POLYESTER

FIELD OF THE INVENTION

The present disclosure relates to a polymer composition and a method of making a liquid laundry detergent composition using the polymer composition.

BACKGROUND OF THE INVENTION

Liquid laundry detergent compositions are known. There is a tendency today to make liquid detergent compositions more compact and minimise unnecessary 'bulking' ingredients or water. This approach is more environmentally friendly as it reduces carbon footprints from transportation and means less packaging can be used. It is also especially beneficial for water-soluble unit dose articles containing the detergents as said water-soluble unit dose articles have limited space for formulating detergent ingredients.

The aesthetic appearance of a laundry detergent composition is important in terms of consumer acceptance. Consumers believe opaque detergent compositions are more effective in terms of performance than translucent ones. This is because consumers believe opaque detergent compositions are more concentrated and so more effective.

Often, opacifying agents need to be added to the liquid laundry detergent composition to make it opaque; these opacifying agents do not add any fabric cleaning or treatment performance value. However, compacted liquid laundry detergent compositions have limited space for addition of such ingredients, especially considering these actives typically are formulated as low active slurries. If they are added, this may require the reduction in the concentration of another cleaning ingredients which would affect overall cleaning performance of the liquid detergent composition.

Therefore, there is a need in the art for means to make an opaque liquid laundry detergent composition without the addition of specific non-performance value adding opacifying materials.

It was surprisingly found that the polymer composition according to the present invention overcame this issue. The polymer composition comprises a polyester terephthalate which provides soil release benefits on fabrics being laundered. However, the specific formulation of this polymer in the claimed polymer composition provided an opaque liquid laundry detergent composition when the polymer composition was added to other ingredients used in liquid laundry detergent compositions.

Hence using the polymer composition of the present invention when making a liquid laundry detergent composition resulted in an opaque liquid laundry detergent composition without the addition of specific non-performance value adding opacifying materials.

SUMMARY OF THE INVENTION

The present disclosure relates to a liquid polymer composition comprising:
a. between 5% and 40% by weight of the polymer composition of a polyester terephthalate, wherein the polyester terephthalate is a polyester terephthalate backbone grafted with one or more anionic groups;
b. between 5% and 40% by weight of the polymer composition of water;
c. between 55% and 85% by weight of the polymer composition of a non-aqueous solvent.

is the present disclosure also relates to the use of a polymer composition according to the present disclosure to provide opaqueness to a detergent composition when the polymer composition is added to a detergent composition

BRIEF DESCRIPTION OF THE DRAWINGS

FIG. 1 is a water-soluble unit dose article according to the present invention.

DETAILED DESCRIPTION OF THE INVENTION

Polymer Composition

The present disclosure relates to a polymer composition. By 'polymer composition' we herein mean that the composition comprises a polymer but is not limited to comprising just a polymer. The polymer composition is liquid. By 'liquid' we herein mean liquids, gels, pastes, dispersions and mixture thereof. The liquid composition can include solids or gases in suitably subdivided form, but the liquid composition excludes forms which are non-fluid overall, such as tablets or granules.

It is intended that the polymer composition is added to other ingredients of liquid laundry detergent compositions. Therefore, the polymer composition is intended as an intermediate composition during the manufacture of final liquid laundry detergent composition.

The polymer composition comprises between 5% and 40%, preferably between 10% and 35%, more preferably between 15% and 25% by weight of the polymer composition of a polyester terephthalate, wherein the polyester terephthalate is a polyester terephthalate backbone grafted with one or more anionic groups. The polyester terephthalate is described in more detail below. Without wishing to be bound by theory, if the level of the polyester terephthalate is too low, then sub-optimal opacifying effect is achieved in the final liquid laundry detergent composition. If the level of polyester terephthalate is too high in the polymer composition, then it does not dissolve and results in undissolved sediments present in the polymer composition and the liquid laundry detergent composition. To dissolve excess undissolved polyester terephthalate addition of more water or non-aqueous solvent is needed, but this then brings further non-performance value adding materials.

Therefore, the present invention also addresses the problem of maximizing the level of polyester terephthalate that can be effectively formulated and that achieves effective opacity of the final liquid laundry detergent composition whilst maintaining stability of the polymer composition and the final liquid laundry detergent composition.

The polymer composition comprises between 5% and 40% preferably between 5% and 15%, preferably between 6% and 12%, more preferably between 7% and 10% by weight of the polymer composition of water.

The polymer composition comprises between 20% and 90%, preferably 55% and 85%, more preferably between 60% and 80%, most preferably between 65% and 75% by weight of the polymer composition of a non-aqueous solvent. Preferably the non-aqueous solvent and the water are in a weight ratio of 5:1 to 15:1, preferably from 8:1 to 10:1. Without wishing to be bound by theory, it is especially preferred to control the levels and ratio of non-aqueous solvent and water when the polymer composition will be used to formulate into a liquid laundry detergent composition within a water-soluble unit dose article. Such control is necessary to ensure integrity of the water-soluble film. Too much water will cause failure of the film due to premature dissolution, and too much non-aqueous solvent will cause failure of the water-soluble unit dose article due to the film being too 'floppy' and the unit dose article losing structural integrity.

Preferably the polymer composition comprises between 20% and 90%, more preferably between 55% and 85%, even more preferably between 60% and 80%, most preferably between 65% and 75% by weight of the polymer composition of a non-aqueous solvent wherein the non-aqueous solvent comprises ethanol, propanol preferably 1-propanol, butanol preferably 1-butanol, ethylene glycol, propylene glycol preferably 1,2-propylene glycol, dipropylene glycol, tripropylene glycol, polyethyleneglycol, polypropyleneglycol, glycerol, trimethylene glycol, or a mixture thereof, preferably wherein the polyethyleneglycol, polypropyleneglycol or mixture thereof has an average molecular weight between 100 and 800 more preferably between 200 and 400. Preferably, the polymer composition comprises between 20% and 90%, more preferably between 55% and 85%, even more preferably between 60% and 80%, most preferably between 65% and 75% by weight of the polymer composition of a non-aqueous solvent wherein the non-aqueous solvent comprises dipropyleneglycol, tripropylene glycol, propylene glycol and glycerol and a mixture thereof, most preferably a mixture of propylene glycol preferably 1,2-propylene glycol, and glycerol. Most preferably the propyleneglycol and the glycerol are in a weight ratio of from 2:1 to 5:1, preferably from 3:1 to 4:1.

Preferably the polymer composition comprises from 60% to 95% preferably from 65% to 90% more preferably from 75% to 85% by weight of the polymer composition of water and non-aqueous solvent. Preferably the polymer composition comprises from 5% to 15% of water, from 15% to 25% of glycerol and from 60% to 80% of propyleneglycol, by weight of the polymer composition.

Preferably, the polymer composition has a pH of between 4 and 8, preferably between 5 and 7, measured neat at 20° C. Those skilled in the art will be aware of known methods to measure the pH. Those skilled in the art will be aware of how to adjust the pH to be within the preferred range by the addition of suitable acidic or alkali materials.

Preferably, the polymer composition has a viscosity of between 10 mPa·s and 1000 mPa·s, preferably between 100 mPa·s and 750 mPa·s, most preferably between 200 mPa·s and 400 mPa·s at 20° C. when measured using a TA Instruments rheometer (preferably model AR-G2, AR2000ex or equivalent) at 10/s with a 40 mm parallel plate & 500 or 1000 μm gap wherein the procedure including a conditioning step, 30 s at 20° C. with no pre-shear followed by continuous ramp from 0.01 to 1200/s, log scale, 32 points per decade, 3 minutes run.

The polymer composition is opaque. By 'opaque' we herein mean less than 1% transmittance measured using a ColorQuest XE spectrophotometer, using 2.5 mL PS cuvettes (1 cm path length), measuring a range from 400 to 700 nm when measured neat.

Polyester Terephthalate

The polyester terephthalate is a polyester terephthalate backbone grafted with one or more anionic groups, more preferably, an anionic polyester of propylene terephthalate.

Suitable anionic polyesters are those that are derived from terephtalic acid, 5-sulfoisophtalic acid or the salt of 5-sulfoisophtalic acid, from ethylene glycol or polyethylene glycol, propylene glycol or polypropylene glycol and polyalkyleneglycol monoalkyl ether, and optionally from further monomers having 3 to 6 functions capable of polycondensation, in particular acid, alcohol or ester functions.

Preferably, the polyester terephthalate comprises the combination of structural units (I) to (III):

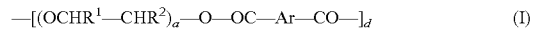

wherein:
a, b and c are from 1 to 200;
d, e and f are from 1 to 50;
Ar is a 1,4-substituted phenylene;
sAr is 1,3-substituted phenylene substituted in position 5 with $SO_3Me$;
Me is Li, K, Mg/2, Ca/2, Al/3, ammonium, mono-, di-, tri-, or tetraalkylammonium wherein the alkyl groups are $(C_1-C_{22})$ alkyl or $(C_2-C_{10})$ hydroxyalkyl, or mixtures thereof;
$R^1$, $R^2$, $R^3$, $R^4$, $R^5$ and $R^6$ are independently selected from H or $(C_1-C_{18})$ n- or iso-alkyl preferably methyl; and $R^7$ is a linear or branched $(C_1-C_{18})$ alkyl, or a linear or branched $(C_2-C_{30})$ alkenyl, or a cycloalkyl group with 5 to 9 carbon atoms, a $(C_6-C_{30})$ aryl group or a $(C_6-C_{50})$ arylalkyl group preferably phenyl or benzyl.

Preferably, the polyester terephthalate comprises the structural units (I) to (III) wherein;
$R^1$ to $R^6$ independently are H or methyl,
$R^7$ is methyl,
a, b and c are a number from 1 to 20, preferably a and b are 1 and c is a number from 2 to 10,
d is a number between 1 and 25, preferably between 1 and 10, more preferably between 1 and 5,
e is a number between 1 and 30, preferably between 2 and 15, more preferably between 3 and 10, and
f is a number between 0.05 and 15, preferably between 0.1 and 10, more preferably between 0.25 and 3.

The polyester terephthalates according to the invention generally have a number average molecular weight in the range of 700 to 50000 g/mol, preferably 800 to 25000 g/mol, more preferably 1000 to 15000 g/mol, most preferably 1200 to 12000 g/mol.

Suitable anionic polyester terephthalate soil release polymers are sold by Clariant under the TexCare® series of polymers, e.g. TexCare® SRA300.

Method of Making of the Polymer Composition

Preferably, the polymer premix is prepared at a temperature above the glass transition temperature of the polyester terephthalate. Those skilled in the art will be aware of how to calculate the glass transition temperature and how to adjust and maintain the temperature above the glass transition temperature of the polyester terephthalate. Preferably, the polymer premix is prepared at a temperature of between 50° C. and 80° C., more preferably between 50° C. and 70° C., even more preferably between 50° C. and 65° C.

The components of the polymer composition may be mixed using any suitable mixing means. Those skilled in the art will be aware of suitable mixers. Suitable mixers include static mixers, dynamic mixers or a combination thereof. When mixing with a static mixer, preferably the polymer composition is mixed between 1/s and 100/s, more preferably between 3/s and 10/s. Examples of suitable static mixers include the SMX range of static mixers commercially available from Sulzer. When using a dynamic mixer, preferably the polymer composition is mixed between 40 rpm and 500 rpm. Examples of suitable dynamic mixers include include pitch blade mixers, disc turbine mixers or propeller mixers. Such mixers are well known and available from numerous commercial sources.

As the components are mixed, the polymer composition will become opaque as they are mixing. Those skilled in the art will recognise when the polymer composition will become opaque and will know how long to mix the components to result in an opaque polymer compositions.

Method of Making a Detergent Composition

An aspect of the present invention is a method for making a liquid detergent composition comprising the steps of;
 a. Making a polymer composition according to the present invention;
 b. Making a surfactant composition, wherein the surfactant composition comprises between 10% and 70%, preferably between 20% and 65%, more preferably between 40% and 60% by weight of the surfactant composition of a non-soap surfactant and a solvent wherein the solvent may be an aqueous solvent, a non-aqueous solvent or a mixture thereof;
 c. Combining the polymer composition and the surfactant composition.
 d. mixing the polymer premix and the surfactant premix;
 e. Optionally adding one or more adjunct ingredients;
 f. Collecting the final opaque liquid detergent composition.

wherein, 'opaque' means the liquid composition having less than 1% transmittance measured using a ColorQuest XE spectrophotometer, using 2.5 mL PS cuvettes (1 cm path length), measuring a range from 400 to 700 nm when the liquid composition is measured neat.

The method may be a continuous method or a batch method.

Preferably, the polymer composition and the surfactant composition are combined in a weight ratio of the polymer composition to the non-soap surfactant composition of 2:1 and 1:25, preferably between 1.5:1 and 1:10.

Preferably, upon combining, the polymer composition and the surfactant composition are mixed using a static mixer, a dynamic mixer or a combination thereof. Preferably, the polymer composition and the surfactant composition are combined at a temperature of between 15° C. and 30° C., more preferably between 17° C. and 25° C.

The liquid laundry detergent composition may comprise between 0.1% and 10%, preferably between 0.5% and 8%, more preferably between 1% and 7%, even more preferably between 1.5% and 6%, most preferably between 2% and 6% by weight of the liquid laundry detergent composition of an anionic polyester terephthalates soil release polymer.

The solvent comprised in the surfactant composition may be selected from water, ethanol, propanol preferably 1-propanol, butanol preferably 1-butanol, ethylene glycol, propylene glycol preferably 1,2-propylene glycol, dipropylene glycol, tripropyleneglycol, polyethylene glycol, polypropylene glycol, glycerol, trimethylene glycol, or a mixture thereof, preferably wherein the polyethylene glycol, polypropylene glycol or mixture thereof has an average molecular weight between 100 and 800 preferably between 200 and 400. Preferably, the solvent comprised in the surfactant composition may be selected from water, propylene glycol, dipropylene glycol, tripropyleneglycol, glycerol and a mixture thereof.

Preferably the solvent comprises from 10% to 40% preferably from 15% to 30% by weight of the liquid detergent composition of a non-aqueous solvent, the non-aqueous solvent preferably comprising from 40% to 80%, preferably from 50% to 70% by weight of the non-aqueous solvent of the propylene glycol, from 10% to 30%, preferably from 15% to 25% by weight of the non-aqueous solvent of dipropylene glycol, tripropylene glycol, or a mixture thereof, and from 10% to 30%, preferably from 15% to 25% by weight of the non-aqueous solvent of glycerol. Preferably the liquid detergent composition will comprise between 1 and 25% preferably between 5% and 15% by weight of the final composition of water.

Preferably, the liquid laundry detergent composition comprises between 15% and 60%, preferably between 20% and 50%, more preferably between 25% and 45% by weight of the liquid laundry detergent composition of non-soap surfactant.

Preferably, the non-soap surfactant comprises anionic non-soap surfactant. Preferably the liquid laundry detergent composition may comprise up to 50%, preferably between 5% and 50%, more preferably between 10% and 45%, even more preferably between 15% and 40% by weight of the liquid laundry detergent composition of a non-soap anionic surfactant. Preferably the non-soap anionic surfactant is selected from an alkyl benzene sulphonate, an alkyl sulphate, an alkoxylated alkyl sulphate or a mixture thereof.

More preferably, the non-soap anionic surfactant is a mixture of linear alkylbenzene sulphonate and alkoxylated alkyl sulphate, more preferably a mixture of linear alkylbenzene sulphonate and ethoxylated alkyl sulphate.

Preferably, the weight ratio of linear alkylbenzene sulphonate to alkoxylated alkyl sulphate, more preferably linear alkylbenzene sulphonate to ethoxylated alkyl sulphate is from 1:2 to 20:1, preferably from 1.1:1 to 15:1, more preferably from 1.2:1 to 10:1, even more preferably from 1.3:1 to 5:1, most preferably from 1.4:1 to 3:1.

The weight ratio of linear alkylbenzene sulphonate to ethoxylated alkyl sulphate may be from 1:10 to 20:1, preferably from 1:7 to 3:1, more preferably from 1:5 to 1.5:1.

Preferably the non-soap surfactant further comprises non-ionic surfactant. The liquid laundry detergent composition preferably comprises less than 10%, preferably between 0% and 9.5%, preferably between 0.01% and 9%, more preferably between 0.1% and 7%, even more preferably between 1% and 5%, most preferably between 1 and 3% by weight of the liquid laundry detergent composition of a fatty alcohol ethoxylate non-ionic surfactant. Preferably, the fatty alcohol ethoxylate has an average alkyl carbon chain length of between 5 and 30, preferably between 8 and 18, more preferably between 10 and 16, most preferably between 12 and 15. Preferably, the fatty alcohol ethoxylate has an average degree of ethoxylation of between 0.5 and 20, preferably between 1 and 15, more preferably between 5 and 12, even more preferably between 6 and 10, most preferably between 7 and 8.

Preferably, the weight ratio of non-soap anionic surfactant to fatty alcohol ethoxylate non-ionic surfactant is between 5:1 and 23:1 preferably between 7:1 and 23:1, more preferably between 8:1 and 23:1, most preferably between 9:1 and 20:1.

The liquid laundry detergent composition may comprise less than 10%, preferably less than 8%, most preferably between 1% and 8% by weight of the liquid laundry detergent composition of fatty acid, neutralised fatty acid soap or a mixture thereof.

Preferably, the liquid laundry detergent composition has a pH from 6 to 10 preferably from 7 to 9, more preferably from 7 to 8. Preferably, the liquid laundry detergent composition comprises a pH adjusting agent selected from alkanolamines, preferably monethanolamine, diethanolamine, triethanolamine or a mixture thereof, most preferably monoethanolamine. The liquid laundry detergent composition may comprise an adjunct ingredient. The adjunct ingredient may be selected from chelants, perfumes, dyes, enzymes, polyethyleneimines, alkoxylated polyethyleneimines, polysaccharide polymers, polyethylene glycol polymers or a mixture thereof. The liquid laundry detergent composition may further comprise other adjunct ingredients selected from hueing dyes, polymers, builders, dye transfer inhibiting agents, dispersants, enzyme stabilizers, catalytic materials, bleach, bleach activators, polymeric dispersing agents, anti-redeposition agents, suds suppressors, aesthetic dyes, opacifiers, perfumes, perfume delivery systems, structurants, hydrotropes, processing aids, pigments, amphoteric surfactants, cyclic diamines, zwitterionic polyamines, anti-oxidants, preservatives and mixtures thereof.

Preferably the detergent composition made according to the present invention is combined with a water-soluble film to make a water-soluble unit dose article wherein the detergent composition is contained in an internal compartment enclosed by the water-soluble film. The water-soluble unit dose article comprises the water-soluble film shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the detergent composition does not leak out of the compartment during storage. However, upon addition of the water-soluble unit dose article to water, the water-soluble film dissolves and releases the contents of the internal compartment into the wash liquor.

The compartment should be understood as meaning a closed internal space within the unit dose article, which holds the detergent composition. During manufacture, a first water-soluble film may be shaped to comprise an open compartment into which the detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments. The compartments may be arranged in superposed orientation, i.e. one positioned on top of the other. In such an orientation the unit dose article will comprise three films, top, middle and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment, but does not completely enclose the second compartment. Alternatively one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments.

Each compartment may comprise the same or different compositions. The different compositions could all be in the same form, or they may be in different forms. The water-soluble unit dose article may comprise at least two internal compartments, wherein the liquid laundry detergent composition is comprised in at least one of the compartments, preferably wherein the unit dose article comprises at least three compartments, wherein the detergent composition is comprised in at least one of the compartments.

FIG. 1 discloses a water-soluble unit dose article (1) according to the present invention. The water-soluble unit dose article (1) comprises a first water-soluble film (2) and a second water-soluble film (3) which are sealed together at a seal region (4). The liquid laundry detergent composition (5) is comprised within the water-soluble soluble unit dose article (1).

The film of the present invention is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Preferably, the water-soluble film comprises polyvinyl alcohol polymer or copolymer, preferably a blend of polyvinylalcohol polymers and/or polyvinylalcohol copolymers, preferably selected from sulphonated and carboxylated anionic polyvinylalcohol copolymers especially carboxylated anionic polyvinylalcohol copolymers, most preferably a blend of a polyvinylalcohol homopolymer and a carboxylated anionic polyvinylalcohol copolymer.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Preferred films are those supplied by Monosol under the trade references M8630, M8900, M8779, M8310.

The film may be opaque, transparent or translucent. The film may comprise a printed area.

The area of print may be achieved using standard techniques, such as flexographic printing or inkjet printing.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Use of the Polymer Composition

Another aspect of the present invention is the use of the polymer composition according to the present invention to provide opaqueness to a detergent composition when the polymer composition is added to a detergent composition.

By 'opaque' we herein mean less than 1% transmittance measured using a ColorQuest XE spectrophotometer, using 2.5 mL PS cuvettes (1 cm path length), measuring a range from 400 to 700 nm when measured neat.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

EXAMPLES

FIG. 1 discloses a water-soluble unit dose article (1) made according to the present invention. The water-soluble unit dose article (1) comprises a first water-soluble film (2) and a second water-soluble film (3) which are sealed together at a seal region (4). The liquid laundry detergent composition (5) is comprised within the water-soluble soluble unit dose article (1).

Example 1

A polymer composition according to the invention (Example I) has been created and added to a surfactant composition to demonstrate its ability to opacify a detergent composition. The same polymer has also been directly added as a powder to this surfactant composition as a comparative example I. While addition of the polymer composition according to the invention (Example I) led to the desired opacification of the resulting detergent composition, direct addition of the polymer powder (Comparative Example I) did not equally opacify the detergent composition. Beyond a physically unstable detergent formulation is obtained with the Comparative Example I.

When formulating a polymer compositon comprising more than 40% of Texcare SRA300, i.e. a polymer according to the invention, at equal P-Diol-glycerol-water ratios (Comparative Example II) physical separation of undissolved Texcare SRA300 powder is equally observed after overnight storage.

Without wishing to be bound by theory it is believed that the dissolved Texcare SRA300 polymers within the polymer composition re-orientate in finely dispersed micron sized droplets, as evidenced by microscopy measurements, providing opacity accordingly, contrary to direct powder added Texcare SRA300 which remains undissolved in the surfactant composition.

Ingredients:

Anionic polyester terephthalate: Texcare SRA 300 (ex Clariant)

Polymer composition (according to the invention): The polymer composition is produced through standard mixing of the 1,2-propanediol, glycerol and water in below proportions. Consequently Texcare SRA300 is added as a powder and stirred for 1 hour at 55° C. till, after initial observation of powder dissolution during first 15 minutes, an opaque composition has developed. Microscopy confirmed the presence of finely dispersed micron sized droplets while absence of undissolved Texcare SRA300 particles.

| Material | Wt % |
| --- | --- |
| 1,2-Propanediol | 56% |
| Glycerol | 16% |
| Water | 8% |
| Texcare SRA 300 | 20% |

Surfactant composition: The surfactant composition is produced through standard mixing of the components described:

| Material | Wt % |
| --- | --- |
| Citric acid | 0.87 |
| 1,2-propanediol | 9.3 |
| Dipropyleneglycol | 4.63 |
| monoethanolamine | 9.38 |
| glycerol | 4.67 |
| HEDP chelant | 2.79 |

| Material | Wt % |
| --- | --- |
| K2SO3 | 0.06 |
| Neodol 24/7 | 2.52 |
| HLAS | 26.69 |
| Brightener 49 | 0.02 |
| TPK fatty acid | 2.01 |
| C1214AE3S | 18.11 |
| Ethoxylated polyethyleneimine (PEI600EO20) | 4.94 |
| MgCl2 | 1.27 |
| Water | Balance |

Preparation of a polymer composition-surfactant composition mixture: The polymer composition and surfactant composition are mixed through standard mixing at room temperature such that Texcare SRA300 will be present at 5.8% in the resulting composition.

Direct addition of Texcare SRA300 powder to the surfactant composition: Texcare SRA300 powder has been added to the surfactant composition such that Texcare SRA300 will be present at 5.8% in the resulting composition. The solution has been mixed through standard mixing at 55° C. for 1 hour. Alternatively the Texcare SRA300 has been added at different stages of the surfactant composition making at varying pH (1.2 till 9.7), temperature (up till 93° C.) and mixing times (up till 1 h30).

Test Results:

While the polymer composition-surfactant composition mixture (example I) resulted in a physically stable and opaque detergent composition, despite similar processing activities, the addition of Texcare SRA300 directly as a powder onto the surfactant composition or during varying stages of the surfactant composition making (Comparative Example I) did not enable to achieve the same degree of opacity as with the polymer composition according to the invention (Example I) and was still comprising undissolved Texcare SRA300 particles, as evidenced by microscopy. Moreover, phase separation is observed with the Comparative Example I formulation after overnight storage at room temperature, resulting in a clear surfactant composition phase and separated undissolved Texcare SRA300 powder.

What is claimed is:

1. A method of making an opaque liquid detergent composition comprising the steps of:
   a. providing a polymer premix, wherein the polymer premix consists of:
      i. between about 5% and about 40% by weight of the polymer premix of an anionic polyester terephthalate polymer, wherein the anionic polyester terephthalate polymer has a polyester terephthalate backbone grafted with one or more anionic groups;
      ii. between about 55% and about 85% by weight of the polymer premix of a solvent, wherein the solvent is a non-aqueous solvent selected from the group consisting of ethanol, propanol, butanol, ethylene glycol, propylene glycol, dipropylene glycol, tripropylene glycol, polyethylene glycol, polypropylene glycol, glycerol, trimethylene glycol, and mixtures thereof; and
      iii. between about 5% and about 40%, by weight of the polymer premix, of water;
   b. providing a surfactant premix, wherein the surfactant premix comprises between about 10% and about 70%, by weight of the surfactant premix of a non-soap surfactant;
   c. combining the polymer premix and the surfactant premix in a weight ratio of the polymer premix to the surfactant premix of between about 2:1 and about 1:25;
   d. mixing the polymer premix and the surfactant premix;
   e. optionally adding one or more adjunct ingredients;
   f. collecting the final opaque liquid detergent composition,
   wherein 'opaque' means the liquid composition having less than about 1% transmittance measured using a ColorQuest XE spectrophotometer, using 2.5 mL PS cuvettes (1 cm path length), measuring a range from about 400 to about 700 nm when the liquid composition is measured neat.

2. The method according to claim 1, wherein the polymer premix comprises between about 60% and about 80% by weight of the polymer premix of the non-aqueous solvent.

3. The method according to claim 2, wherein the polymer premix comprises between about between about 65% and about 75% by weight of the polymer premix of the non-aqueous solvent.

4. The method according to claim 1 wherein the polyethylene glycol, polypropylene glycol or a mixture thereof has an average molecular weight between about 100 and about 800.

5. The method according to claim 4 wherein the non-aqueous solvent is the group consisting of dipropyleneglycol, tripropyleneglycol, propylene glycol, glycerol, and a mixture thereof.

6. The method according to claim 1 wherein the non-aqueous solvent comprises propylene glycol and glycerol and wherein the propylene glycol is present at a level of between about 45% and about 65%, by weight of the polymer premix and the glycerol is present at a level of between about 10% and about 20% by weight of the polymer premix.

7. The method according to claim 6 wherein the propylene glycol and the glycerol are present in a weight ratio of from about 2:1 to about 5:1.

8. The method according to claim 1 wherein the polymer premix comprises between about 5% and about 15% by weight of the polymer premix of water.

9. The method according to claim 1 wherein the polyester terephthalate comprises a combination of the structural units (I) to (III):

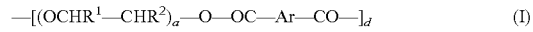

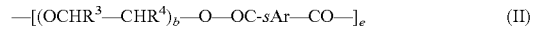

wherein:
   a, b and c are from about 1 to about 200;
   d, e and f are from about 1 to about 50;
   Ar is a 1,4-substituted phenylene;
   sAr is 1,3-substituted phenylene substituted in position 5 with SO$_3$Me;
   Me is Li, K, Mg/2, Ca/2, Al/3, ammonium, mono-, di-, tri-, or tetraalkylammonium wherein the alkyl groups are (C$_1$-C$_{22}$) alkyl or (C$_2$-C$_{10}$) hydroxyalkyl, or mixtures thereof;
   R$^1$, R$^2$, R$^3$, R$^4$, R$^5$ and R$^6$ are independently selected from H or (C$_1$-C$_{18}$)n- or iso-alkyl preferably methyl; and R$^7$ is a linear or branched (C$_1$-C$_{18}$) alkyl, or a linear or branched (C$_2$-C$_{30}$) alkenyl, or a cycloalkyl group with 5 to 9 carbon atoms, a (C$_6$-C$_{30}$) aryl group or a (C$_6$-C$_{50}$) arylalkyl group preferably phenyl or benzyl.

10. The method according to claim 9 wherein:
$R^1$ to $R^6$ independently are H or methyl,
$R^7$ is methyl,
a, b and c are a number from about 1 to about 20,
d is a number between about 1 and about 25,
e is a number between about 1 and about 30, and
f is a number between about 0.05 and about 15.

11. The method according to claim 1 wherein the polymer premix comprises between about 10% and about 35%, by weight of the polymer premix of the anionic polyester terephthalate polymer.

12. The method according to claim 1 wherein the polymer premix has a pH between about 4 and about 8.

13. The method according to claim 1 wherein the solvent comprised in the surfactant premix is the group consisting of water, ethanol, propylene glycol, dipropylene glycol, tripropylene glycol, polyethylene glycol, polypropylene glycol, glycerol, trimethylene glycol, or a mixture thereof.

14. The method according to claim 1, wherein the detergent composition is combined with a water-soluble film to make a water-soluble unit dose article, wherein the detergent composition is contained in an internal compartment enclosed by the water-soluble film.

15. The method according to claim 1, wherein the non-soap surfactant comprises between 50% and 100% by weight of the non-soap surfactant of a non-soap anionic surfactant, the non-soap anionic surfactant comprising the protonated form of the non-soap anionic surfactant, the neutralized salt form of a non-soap anionic surfactant or a mixture thereof.

* * * * *